United States Patent
Ng

(10) Patent No.: US 9,134,848 B2
(45) Date of Patent: Sep. 15, 2015

(54) TOUCH TRACKING ON A TOUCH SENSITIVE INTERFACE

(75) Inventor: Hon Siong Ng, Singapore (SG)

(73) Assignee: STMicroelectronics Asia Pacific Pte Ltd, Singapore (SG)

( * ) Notice: Subject to any disclaimer, the term of this patent is extended or adjusted under 35 U.S.C. 154(b) by 1281 days.

(21) Appl. No.: 12/477,745

(22) Filed: Jun. 3, 2009

(65) Prior Publication Data

US 2010/0309139 A1   Dec. 9, 2010

(51) Int. Cl.
*G06F 3/041*   (2006.01)

(52) U.S. Cl.
CPC .................... *G06F 3/0418* (2013.01)

(58) Field of Classification Search
CPC ...... G06F 3/0418; G06F 3/041; G06F 3/0426
USPC .................. 345/173; 382/103, 107
See application file for complete search history.

(56) References Cited

U.S. PATENT DOCUMENTS

| | | | | |
|---|---|---|---|---|
| 6,301,370 B1 * | 10/2001 | Steffens et al. | ................ | 382/103 |
| 6,888,536 B2 * | 5/2005 | Westerman et al. | .......... | 345/173 |
| 7,450,736 B2 * | 11/2008 | Yang et al. | ..................... | 382/103 |
| 7,936,341 B2 * | 5/2011 | Weiss | ............................. | 345/173 |
| 8,305,357 B2 * | 11/2012 | Liao et al. | ..................... | 345/174 |
| 2007/0247435 A1 | 10/2007 | Benko et al. | | |
| 2007/0252821 A1 | 11/2007 | Hollemans et al. | | |
| 2008/0309639 A1 | 12/2008 | Wei et al. | | |
| 2010/0097342 A1 * | 4/2010 | Simmons et al. | .............. | 345/174 |

\* cited by examiner

*Primary Examiner* — Sahlu Okebato
(74) *Attorney, Agent, or Firm* — Gardere Wynne Sewell LLP

(57) ABSTRACT

A method tracks a plurality of touch points across successive frames of a touch sensitive input device to determine a trajectory. Each touch point on a frame of a touch sensitive input device is correlated with another distinct touch point on a subsequent frame of the same touch sensitive input device. The correlation is based on examining in the subsequent frame an area surrounding each touch point on the previous frame. Touch points identified within this search area are prioritized based on a projected trajectory through the prior touch point based on historical data.

17 Claims, 4 Drawing Sheets

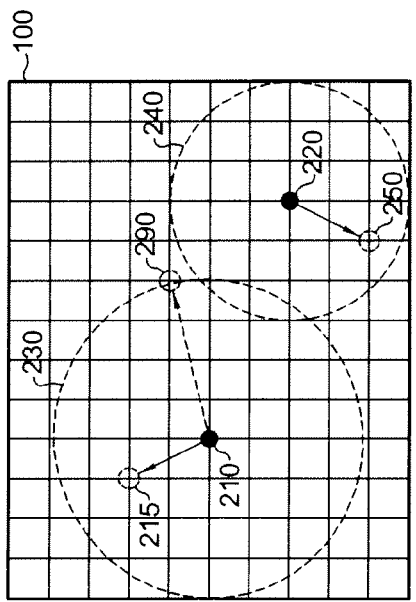
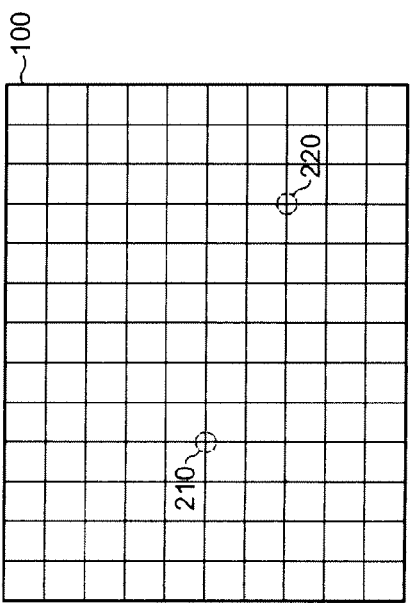
Fig. 2B
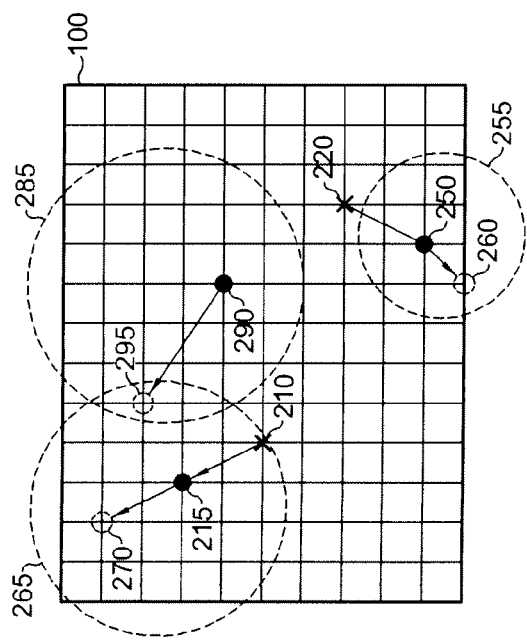
Fig. 2A
Fig. 2C

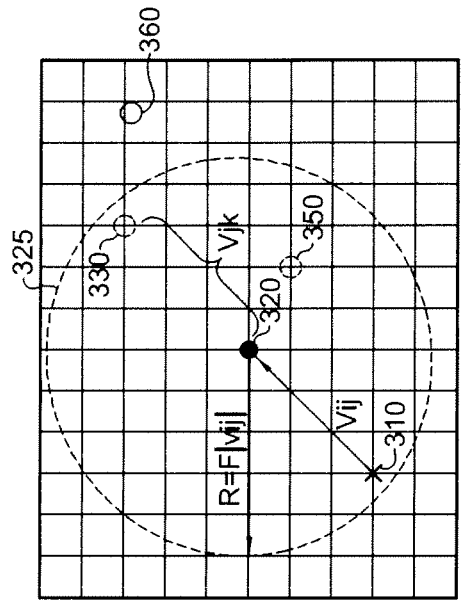
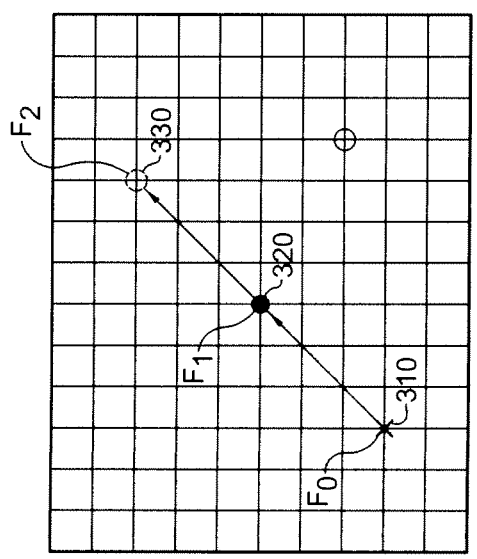
Fig. 3B
Fig. 3A

TOUCH TRACKING ON A TOUCH SENSITIVE INTERFACE

BACKGROUND OF THE INVENTION

1. Field of the Invention

Embodiments of the present invention relate, in general, to touch sensitive interfaces and more particularly to touch tracking between successive frames on a touch sensitive interface.

2. Relevant Background

A touch screen system is a computer input device/system capable of receiving input signals for a computer or processor through a pressure sensitive plate. When an input stylus, a pen, or a finger touches the pressure sensitive plate (the 'touch screen') at a point on the surface of the touch screen, the touch screen system senses the location of the 'touch point' within the area of the touch screen. The touch screen system sends information concerning the location of the touch point to the processor. The processor is operable to associate specific locations on the touch screen with certain predetermined input signals. For example, touching one area of the touch screen may instruct the computer to perform a certain function and touching another area of the touch screen may instruct the computer to perform another function.

Input devices such as a touch screen are designed to detect the application of a force and to determine one or more specific characteristics of that force as relating to the input device. These characteristics may include the location of the force as acting on the input device, the magnitude of force applied by the object to the input device, or the duration of the force.

Currently, there are a variety of different types of input devices available on the market. Some examples include resistive-based input devices, capacitance-based input devices, surface acoustic wave-based devices, force-based input devices, infrared-based devices, and others. While each provides some useful functional aspects, each of these prior related types of input devices suffers in one or more areas.

A resistance-type touch screen is generally a transparent four-layer compound screen of thin film, with the bottom being a base layer made of glass or organic glass, the top being a plastic layer whose outer surface has undergone cure process and thus becomes smooth and resistant to scratches, and the middle layer comprising two metal conductive layers disposed on the base layer and next to the inner surface of the plastic layer, respectively, the two conductive layers being spaced from each other by many minute (smaller than $\frac{1}{1000}$ inch) transparent separating points between them. When the screen is touched with a finger, the two conductive layers contact with each other at the touch point.

The two metal conductive layers are operating faces of the touch screen, and two strips of silver paste are coated to both ends of each operating face respectively and referred to as a pair of electrodes for this operating face. If a voltage is applied to the pair of electrodes for one of the operating faces, a uniform and continuous distribution of parallel voltage will be formed on the operating face. When a prescribed voltage is applied to the pair of electrodes in the X axis direction, and no voltage is applied to the pair of electrodes in the Y axis direction, the voltage value at the touch point can be reflected on the Y+ (or Y−) electrode in the parallel voltage field along the X axis, and the coordinate of the touch point along the X axis can be obtained by measuring the voltage value of the Y+ electrode with respect to the ground. Similarly, when a voltage is applied to the pair of electrodes in the Y axis direction, and no voltage is applied to the pair of electrodes in the X axis direction, the coordinate of the touch point along the Y axis can be obtained by measuring the voltage value of the X+ electrode with respect to the ground. Finally, the coordinates of the pressure center point can be obtained by calculating a weighted average of the coordinates of all touch points with a controller for the touch screen. Unfortunately this axis histogram approach fails to reject ghost key inputs, nor can it detect multiple touches.

Most of the touch screen input modes known in the prior art have at least one thing in common: they assume that the touch-sensitive screen is touched at only one point at a time. Indeed, these screens are designed with this assumption in mind. When a user accidentally touches the screen at more than one point (for example, by hitting two 'virtual keys' at the same time), these screens become confused and either capture neither touch or, assuming a single touch, compute a location of the assumed single touch that is some confusing combination of the locations of the multiple touches. Either case confuses the user, and the latter case may result in unwanted input being sent to an application reading the screen.

The problem of accidentally touching more than one location at a time has existed at least since the introduction of the typewriter keyboard in the nineteenth century. Indeed the arrangement of the letters on the typewriter keyboard was designed to minimize such multiple key touches. Somewhat alleviating the problem, a user of a physical keyboard can usually tell by feel that he has hit more than one key. Unlike these physical keyboards, however, touch-sensitive screens are so rigid, and have essentially no 'give,' that they cannot provide tactile feedback to tell the user that he is touching the screen at more than one location.

Another problem with most touch screens is their difficulty to track the movement of multiple points. At a simple level a single touch on a screen can be moved over a series of frames to construct a track, for example a movement on a touch screen to scroll a window using the single motion (track) of a finger. However, once multiple touch points are introduced, the ability to develop independent tracks from each of these touch points becomes problematic.

One technique known in the art is to search within a certain radius of a touch point on the frame prior and on the frame after to determine whether additional points exist. If in the prior frame within a certain search distance another touch exists, a prospective trajectory can be formed. Then if in the frame after another touch point is found within the same search area and along the projected trajectory, a track can be formed. This backward and forward comparison continues until a minimal solution is achieved. Unfortunately this type of technique requires substantial computational resources and does not support new entry or exit points. For example during the period that one track has been determined, this technique does not consider the possibility that within a certain search period a new touch point may be introduced initiating a new track. Thus the challenge to efficiently track multiple points across multiple frames of a touch screen is addressed by the present invention, hereafter presented by way of example.

BRIEF SUMMARY OF THE INVENTION

A method and system for tracking a plurality of touch points across successive frames of a touch sensitive input device are hereafter described by way of example. According to one embodiment of the present invention, each touch point on a frame of a touch sensitive input device (also referred to herein as a touch sensitive interface or interface) is correlated with another distinct touch point on a subsequent frame of the same touch sensitive input device. The correlation is based on examining in the subsequent frame an area surrounding each touch point in the previous frame. Touch points identified within this search area are prioritized based on a projected trajectory through the prior touch points based on historical data.

According to another embodiment of the present invention, the search distance surrounding each touch point is independently determined and can be based on a differential positional change of each touch point between the present frame and a prior frame. According to another aspect of the present invention, a new touch point can be designated if within a prescribed search area two or more touch points are identified. When multiple points lie within the search area, the touch point more closely aligned with the established trajectory and rate of change is determined to be the next touch point on the trajectory. Other points within the search area are designated as new.

The features and advantages described in this disclosure and in the following detailed description are not all-inclusive. Many additional features and advantages will be apparent to one of ordinary skill in the relevant art in view of the drawings, specification, and claims hereof. Moreover, it should be noted that the language used in the specification has been principally selected for readability and instructional purposes and may not have been selected to delineate or circumscribe the inventive subject matter; reference to the claims is necessary to determine such inventive subject matter.

BRIEF DESCRIPTION OF THE SEVERAL VIEWS OF THE DRAWINGS

The aforementioned and other features and objects of the present invention and the manner of attaining them will become more apparent, and the invention itself will be best understood, by reference to the following description of one or more embodiments taken in conjunction with the accompanying drawings, wherein:

FIGS. 2A-2C show a touch sensitive interface having a plurality of touch points over three successive frames and the search area associated with each touch point according to one embodiment of the present invention;

FIGS. 3A and 3B show two successive frames of a touch sensitive interface in showing the determination of touch tracking based on a historical trajectory according to one embodiment of the present invention.

Figure 1A:
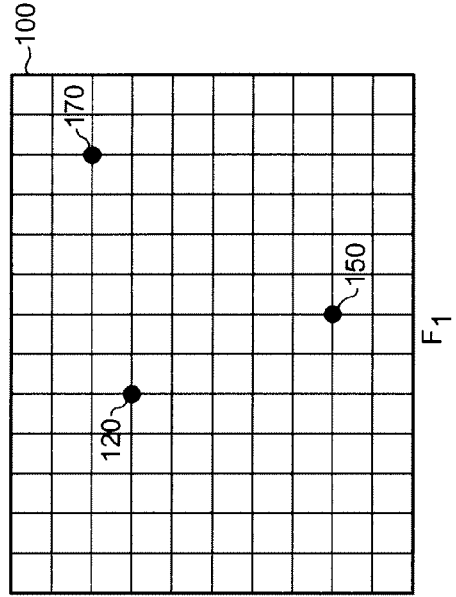
FIGS. 1A-1D show a touch sensitive interface having a plurality of touch points over three successive frames and the resulting touch tracking according to one embodiment of the present invention.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE INVENTION

Specific embodiments of the present invention are hereafter described in detail with reference to the accompanying Figures. Like elements in the various Figures are identified by like reference numerals for consistency. Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention.

FIGS. 1A-1D show a touch sensitive interface having a plurality of touch points over three successive frames and the resulting touch tracking according to one embodiment of the present invention. As is known to one skilled in the relevant art, a touch sensitive interface, such as a touch sensitive screen, comprises a plurality of touch pads arranged in a grid that when displaced register an input. While many such pads may be displaced during a single contact, the contact can be resolved to a single touch coordinate. It is also possible that a single contact may involve multiple touch points or that at a single point of time the touch sensitive interface can experience multiple contacts. For the purposes of the present invention it is assumed that a contact, be it a single or multiple instance and regardless whether each contact involves only one touch point of a plurality of touch points, can be resolved into distinct touch coordinates.

It also is assumed that every contact or finger touch of a touch sensitive interface is associated with some amount of inertia. Thus over a series of frames a contact will register successive touch points at differing locations. Moreover each touch point is associated with a single trajectory in which there are no missing points or occlusions.

FIGS. 1A-1D show three successive frames of a touch sensitive interface and final overlay of the three frames illustrating the resulting trajectories. For the purposes of this application, a frame is considered to be a single discrete period of time in which the input values registered by the touch pads on the touch sensitive interface are reported to a processor for processing. Thus there is a sample window during which input values may be received, but upon expiration of that window, a new window or frame is created.

Figure 1B:
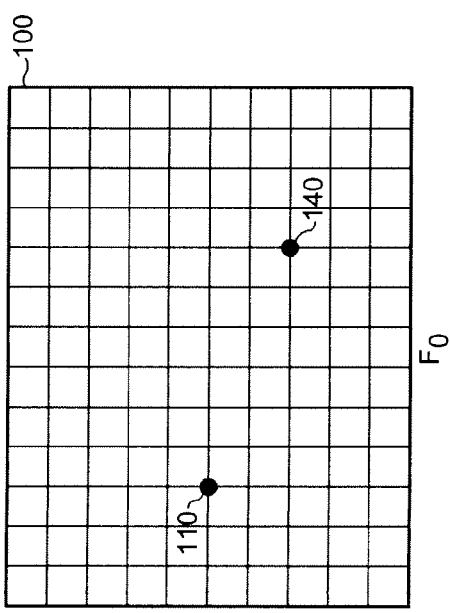
Figure 1C:
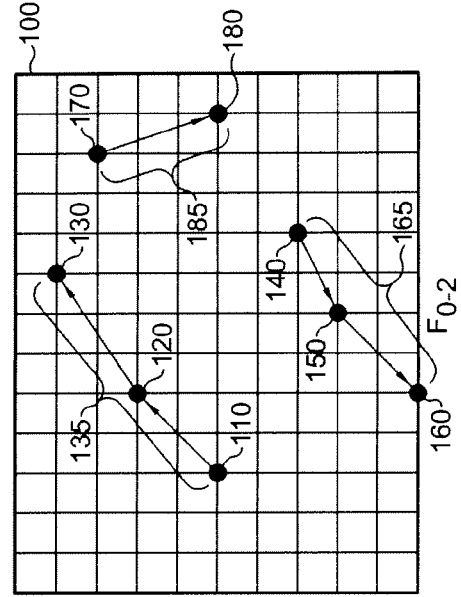

FIG. 1A shows a frame of a touch sensitive interface 100 at time $F_0$ having two touch points 110, 140. These two touch points may be from a single contact having multiple touch points or two contacts, each with singular touch points. FIG. 1B is the same touch sensitive interface 100 of FIG. 1A but at the next successive sampling period, i.e. at the next frame $F_1$. As shown the touch sensitive interface 100 has registered three touch points 120, 150, 170 at three distinct locations. It is also noted that the three points are at locations different from those registered at time $F_0$. FIG. 1C shows the same touch sensitive interface at frame $F_2$. Again three touch points 130, 160, 180 are present but again at unique locations with respect to each prior frame.

Figure 1D:
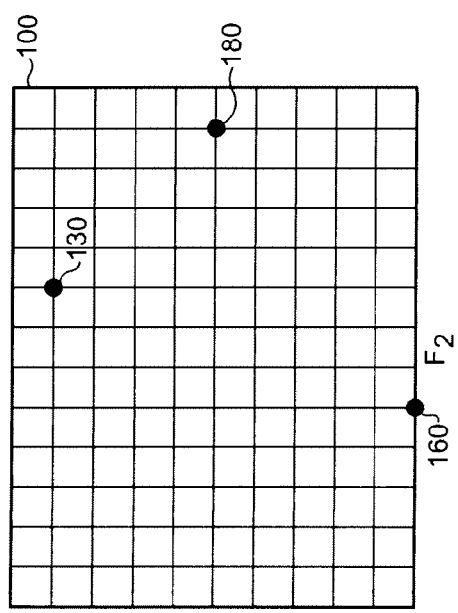

By conducting a search within a prescribed radius of each touch point in a first frame for the existence of a touch point in a subsequent frame combined with the projected trajectory of the point based on its relationship to a touch point in the previous frame, a likely tracking trajectory can be determined. FIG. 1D shows, according to one embodiment of the present invention, the likely trajectories associated with each of the touch points illustrated in FIGS. 1A-1C. As shown touch points 110, 120, and 130 are combined to form a first trajectory 135. Touch points 170 and 180 are combined to form a second trajectory 185 and touch points 140, 150 and 160 are combined to form a third trajectory 165.

FIGS. 2A-2C show a touch sensitive interface having a plurality of touch points over three successive frames and the search area associated with each touch point according to one embodiment of the present invention. According to one embodiment of the present invention, touch points are classified as either being "normal" or "new". A normal touch point is one that is associated with a touch point of a prior frame and one that is likely part of an existing trajectory. A new point is a touch point that is not associated with an established trajectory.

FIG. 2A shows a touch sensitive interface 100 in a grid layout at frame $F_0$ having a first touch point 210 and a second touch point 220. Each touch point is new meaning that in frame $F_{-1}$ the touch sensitive interface 100 was void of touch points or that any existing touch point in $F_{-1}$ disassociated with those found in $F_0$. According to one embodiment of the present invention, for each new point in frame $F_1$, a search is conducted based on a region centered around the points present in frame $F_0$. Thus frame $F_1$, shown in FIG. 2B shows the same touch sensitive interface 100 with a third touch point 215, a fourth touch point 290 and a fifth touch point 250. Also shown in FIG. 2B is a historical perspective of where the first touch point 210 and the second touch point 220 would exit. From this historical position of the first and second touch points 210, 220 a first search area 230 and a second search area 240 are constructed respectively.

Within the second search area 240, which is centered around this historical location of the second touch point 220, only the fifth touch point 250 exists. According to one embodiment of the present invention, the presence of a touch point within the designated search area establishes the two touch points as being associated and forms a trajectory from frame $F_0$ to frame $F_1$. When the search area 240 is void of any touch points it would be assumed that the touch point of the previous frame, the second touch point 220 of frame $F_0$, and any trajectory associated with that touch point cease to exist.

Turning again to FIG. 2B, it can be seen that within the first search area 230 exists both the third touch point 215 and the second touch point 220. According to one embodiment of the present invention, the closest point to the center of the search area, i.e. the touch point in frame $F_1$ closest to the location of the touch point of the prior frame, is designated as being associated with the previous touch point. Thus in this example the first touch point 210 of Frame $F_0$ is associated with the third touch point 215 located in frame $F_1$. As the touch points of the previous frame are each associated with a distinct touch point in frame $F_1$ and the touch points can only have a single such association, the fourth touch point 290 is designated as a new point. Note that in frame $F_1$ the third and fifth touch points 215, 250 are designated as normal points, while the fourth touch point 290 is designated as a new touch point.

FIG. 2C shows frame $F_2$ of the touch sensitive interface 100 of FIGS. 2A and 2B. In frame $F_2$ three new touch points are registered. The touch points include a sixth touch point 270, a seventh touch point 295 and an eighth touch point 260. In addition, and for illustrative purposes, the historical positions of the first touch point 210, the second touch point 220, the third touch point 215, the fourth touch point 290 and the fifth touch point 250 are shown. As with the prior frame $F_1$, a search area is formed at the historical location of the touch points found in frame $F_1$. Thus a third search area 265 is centered at the historical location of the third touch point 215, a fourth search area 285 is centered at the historical location of the fourth touch point 290, and a fifth search area 255 is centered at the historical location of the fifth touch point 250.

Recall that the fourth touch point 290 was designated as new while the third and fifth touch points 215, 250 were classified as being normal touch points. According to one embodiment of the present invention, the association of a touch point in a subsequent frame with a normal point existing in the prior frame is based on the distance between the two points and a minimization of a cost function that yields maximum correlation.

Within the fifth search area 255 surrounding the historical location of the fifth touch point 250 only one touch point, the eighth touch point 260, exists. Thus in this instance the minimization of the cost function is mute. However within the third search area 265 that surrounds the historical location of the third touch point 215, two touch points exist. Both the sixth touch point 270 and the seventh touch point 295 are equidistant from the center of the third search area 265.

According to one embodiment of the present invention, a cost function is applied to both perspective touch points and the touch point in which the cost function is minimized is chosen as the point that will be used to form the ensuing trajectory. The cost function gauges which point within the search area is most likely to belong to the trajectory. The function is proportional to the change in speed and direction of the trajectory. The cost function $\Phi$ according to one embodiment can be in the form:

$$\Phi = \alpha \Phi_d + \beta \Phi_s$$

$$\forall \, \alpha + \beta = 1$$

$$\Phi_d = 1 - \frac{(\overline{p}_{i,n-2} - \overline{p}_{j,n-1}) \cdot (\overline{p}_{j,n-1} - \overline{p}_{k,n})}{|\overline{p}_{i,n-2} - \overline{p}_{j,n-1}||\overline{p}_{j,n-1} - \overline{p}_{k,n}|} = 1 - \frac{\overline{v}_{ij} \cdot \overline{v}_{jk}}{|\overline{v}_{ij}||\overline{v}_{jk}|}$$

$$\Phi_s = 1 - \frac{2(|\overline{p}_{i,n-2} - \overline{p}_{j,n-1}||\overline{p}_{j,n-1} - \overline{p}_{k,n}|)^{1/2}}{|\overline{p}_{i,n-2} - \overline{p}_{j,n-1}| + |\overline{p}_{j,n-1} - \overline{p}_{k,n}|} = 1 - \frac{(|\overline{v}_{ij}||\overline{v}_{jk}|)^{1/2}}{|\overline{v}_{ij}| + |\overline{v}_{jk}|}$$

wherein $\alpha$ is direction and $\beta$ is distance.

Thus the cost using the aforementioned function is determined for continuing the trajectory from the previous point to each new point. Turning back to the example shown in FIG. 2C, the cost of extending the trajectory from the third touch point 215 to either the sixth touch point 270 or the seventh touch point 295 is different. While the distance to each point is substantially the same, the directional aspect is different. Extending the direction and magnitude of the trajectory from the first touch point 210 to the third touch point 215, it can been seen that the sixth touch point 270 will have a lower cost function than the seventh touch point 295. Accordingly the seventh touch point 295 is disregarded and the sixth touch point 270 is associated with the third touch point 215 continuing the trajectory that began with the first touch point 210.

As with the determination of associated touch points in FIG. 2B, the seventh touch point of FIG. 2C is also based on the determination of which touch point within the designated search area, search area four 285, is closest to the historical location of touch point four 290. In this case touch point seven 295 is the only point within the search radius and is thus associated with touch point four 290 forming a new trajectory.

FIGS. 3A and 3B are two successive frames of a touch sensitive interface showing the determination of touch tracking based on a historical trajectory according to one embodiment of the present invention. As previously discussed, a search area is formed around a historical position of a first point in a previous frame to determine whether in the next consecutive frame another touch point can be associated with the first point as the basis of a trajectory. According to one embodiment of the invention, the size of the search area is variable and based on a historical distance between points on the trajectory. FIG. 3A shows a compilation of three touch points, touch point one 310, touch point two 320 and touch point three 330, over three consecutive frames, $F_0$, $F_1$, and $F_2$, respectively. As shown by the arrows, a trajectory is established and the distance or displaced number of touch pads can be determined.

FIG. 3B shows a search area 325 centered around the location of touch point two 320. According to one embodiment of the present invention, the radius of the search area 325 for finding the associated touch point in frame $F_2$ is based on the displacement of normal touch points from frame $F_0$ to frame $F_1$. Assuming this displacement (distance) is $V_{ij}$ and R is the radius, the $R_{max}=f(\|V_{ij}\|)$. When no such historical data is available, such as when the touch point is classified as a new point, a predefined search radius can be used. The functional aspects of the maximum search radius can be varied as will be appreciated by one skilled in the art. For example, according to one embodiment of the present invention, the maximum search radius may be a 3× multiple of $V_{ij}$. In other embodiments the multiple may change. Furthermore, when additional historical data is available the search radius may be a multiple of an average or median of a statistically significant number of point to point displacements.

Figure 4:
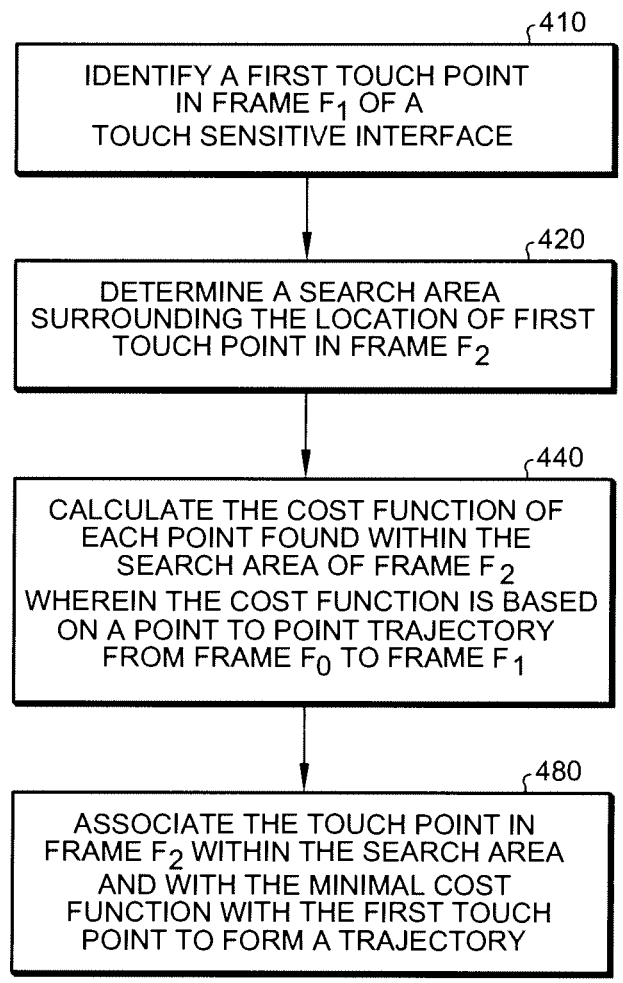
FIG. 4 is a flowchart of one method embodiment for touch point tracking according to the present invention.

FIG. 4 is a flowchart illustrating a method of implementing an exemplary process for touch point tracking on a touch sensitive interface. In the following description, it will be understood that each block of the flowchart illustrations, and combinations of blocks in the flowchart illustrations, can be implemented by computer program instructions. These computer program instructions may be loaded onto a computer or other programmable apparatus to produce a machine such that the instructions that execute on the computer or other programmable apparatus create means for implementing the functions specified in the flowchart block or blocks. These computer program instructions may also be stored in a computer-readable memory that can direct a computer or other programmable apparatus to function in a particular manner such that the instructions stored in the computer-readable memory produce an article of manufacture including instruction means that implement the function specified in the flowchart block or blocks. The computer program instructions may also be loaded onto a computer or other programmable apparatus to cause a series of operational steps to be performed in the computer or on the other programmable apparatus to produce a computer implemented process such that the instructions that execute on the computer or other programmable apparatus provide steps for implementing the functions specified in the flowchart block or blocks.

Accordingly, blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware-based computer systems that perform the specified functions or steps, or combinations of special purpose hardware and computer instructions.

As shown in FIG. 4, one method embodiment for touch point tracking involves identifying 410 a first touch point in a frame $F_1$ of the touch sensitive interface. To determine whether another touch point in a subsequent frame will be associated with the first touch point and thus form a touch point tracking trajectory, a search area surrounding the location of the first touch point in frame $F_1$ is formed 420 in frame $F_2$.

For each touch point found within the search area, a cost function is calculated 440. The cost function is based on both the distance between a point and the center of the search area and the historical trajectory of points leading up to frame $F_1$. For example assume two points are found within the search area. Further assume that the touch point in frame $F_1$ is one of a long trajectory of points such that the extent of the search area, is based on a historical distance between successive points. According to one embodiment of the present invention, the determination of what point within the search area will be used as the next point on the trajectory is based on an extrapolated direction of the prior point's trajectory and magnitude of the trajectory. Thus a point close to the center of the search radius but in a completely distinct direction may be less likely (or said another way, have a higher cost function) to be selected as the next touch point in a trajectory than a point located at a distance consistent with the distances between prior points and substantially aligned with the existing trajectory.

Therefore, using the results of the cost function for each point within the designated search area, a touch point in frame $F_2$ is associated 480 with the first touch point in frame $F_1$ to establish or continue a trajectory. Below is one embodiment of pseudo code capable of identifying one or more touch points within successive frames of a touch sensitive screen and associating them to form touch tracking.

```
Frame initialization (f_1)
    for each p_1 in f_1 then
    end
Step 1: Maximum correlation
    for each p_1 in f_{n-1} then
        for each p_2 in f_n then
            if p_1.Status == NORMAL then
                distance = | p_1 - p_2 |;
                %Check p_1 within search area of p_2
                if distance < p_1.SearchRadius then
                    %add sort data
                    cost = CalculateCost (p_1, p_2);
                    AddSortData (cost, p_1.ID, p_2.ID);
                end
            end
        end
    end
    %sort ascending by cost (column 1)
    SortData(1);
    for each p_1 in f_{n-1} then
        %find 1^st entry (minimal cost)
        for i from 0 to SortTable.Len
            if SortTable.Entry(i).Col1 = p_1.ID then
                p_2.TrajID = p_1.TrajID;
                p_2.Status = NORMAL;
            end
        end
    end
Step 2: Nearest neighbor
    for each p_2 in f_n then
        for each p_1 in f_{n-1} then
            if p_1.Status == NEW then
                distance = | p_1 - p_2 |;
                %Check p_1 within default search area of p_2
                if distance < RADIUS_MAX then
                    %add sort data
                    AddSortData (distance, p_1.ID, p_2.ID);
                end
            end
        end
    end
    %sort ascending by distance (column 1)
    SortData(1);
    for each p_1 in f_{n-1} then
        %find 1^st entry (shortest distance)
        for i from 0 to SortTable.Len
            if SortTable.Entry(i).Col2 = p_1.ID then
                p_2.TrajID = p_1.TrajID;
                p_2.Status = NORMAL;
            end
        end
    end
Step 3: Remaining points
    for each p_2 in f_n then
        %check if belongs to a trajectory after Step 1 and 2
        if p_2.Status == NULL then
            p_2.Status = NEW;
        end
    end
```

In a preferred embodiment, the present invention can be implemented in firmware and/or software. Software programming code that embodies the present invention is typically accessed by a microprocessor from long-term, persistent storage media of some type, such as a flash drive or hard drive. The software programming code may be embodied on any of a variety of known media for use with a data processing system, such as a hard drive or CD-ROM. The code may be distributed on such media, or may be distributed from the memory or storage of one computer system over a network of some type to other computer systems for use by such other systems. Alternatively, the programming code may be embodied in the memory of the device and accessed by a microprocessor using an internal bus. The techniques and methods for embodying software programming code in memory, on physical media, and/or distributing software code via networks are well known and will not be further discussed herein.

Generally, program modules include routines, programs, engines, objects, components, data structures and the like that perform particular tasks or implement particular abstract data types. Moreover, those skilled in the relevant art will appreciate that the invention can be practiced with other computer system configurations, including hand-held devices, multi-processor systems, microprocessor-based or programmable consumer electronics, network PCs, minicomputers, mainframe computers and the like or any system using a touch sensitive interface. The invention may also be practiced in distributed computing environments where tasks are performed by remote processing devices that are linked through a communications network. In a distributed computing environment, program modules may be located in both local and remote memory storage devices.

An exemplary system for implementing the invention includes a general purpose computing device in the form of a conventional personal computer, a personal communication device or the like. Such a system includes a processing unit, a system memory, and a system bus that couples various system components including the system memory to the processing unit. The system bus may be any of several types of bus structures including a memory bus or memory controller, a peripheral bus, and a local bus using any of a variety of bus architectures. The system memory generally includes read-only memory (ROM) and random access memory (RAM). A basic input/output system (BIOS), containing the basic routines that help to transfer information between elements within the personal computer, such as during start-up, is stored in ROM. The personal computer may further include a hard disk drive for reading from and writing to a hard disk and/or a magnetic disk drive for reading from or writing to a removable magnetic disk. The hard disk drive and magnetic disk drive are connected to the system bus by a hard disk drive interface and a magnetic disk drive interface respectively. The drives and their associated computer-readable media provide non-volatile storage of computer readable instructions, data structures, program modules and other data for the personal computer. Although the exemplary environment described herein employs a hard disk and a removable magnetic disk, it should be appreciated by those skilled in the art that other types of computer readable media which can store data that is accessible by a computer, such as flash memory cards, digital video disks, random access memories (RAMs), read-only memories (ROMs) and the like may also be used in the exemplary operating environment.

Embodiments of the present invention present a method and system that is optimized for touch tracking based on movement characteristics of a plurality of touch points. The methodology presented herein is forward based meaning that by storing and using historical data a trajectory can be determined upon registering input data from a touch sensitive interface. With new input data, i.e. new touch points, embodiments of the present invention can determine whether these touch points should be rightly associated with touch points existing in a previous frame to efficiently and accurately form a trajectory. The present invention utilizes a lower number of iterations to make a determination and has smaller memory requirements than those techniques currently known to one skilled in the art.

As will be understood by those familiar with the art, the invention may be embodied in other specific forms without departing from the spirit or essential characteristics thereof. Likewise, the particular naming and division of the modules, managers, functions, systems, engines, layers, features, attributes, methodologies, and other aspects are not mandatory or significant, and the mechanisms that implement the invention or its features may have different names, divisions, and/or formats. Furthermore, as will be apparent to one of ordinary skill in the relevant art, the modules, managers, functions, systems, engines, layers, features, attributes, methodologies, and other aspects of the invention can be implemented as software, hardware, firmware, or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

While there have been described above the principles of the present invention in conjunction with touch tracking in touch sensitive interfaces, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features that are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The Applicant hereby reserves the right to formulate new claims to such features and/or combinations of such features during the prosecution of the present application or of any further application derived therefrom.

I claim:

1. A method, comprising:
    receiving input values that are registered by touch locations of a touch sensitive input device;
    generating a plurality of frames from the received input values, each frame including one or more touch points;

correlating each touch point on a first frame of the plurality of frames with a distinct touch point on a subsequent frame of the plurality of frames, wherein correlating comprises isolating the at least one distinct touch point by a search distance associated with each touch point on the first frame and a trajectory associated with each touch point on the first frame, performing a trajectory cost function for each of the distinct touch points in the subsequent frame and associating one of the distinct touch points in the subsequent frame having a minimal cost function with a first touch point in the first frame to extend the trajectory, wherein the search distance has a magnitude for each of the distinct touch points on the subsequent frame that is based on a differential positional change of each touch point between the first frame and a prior frame of the plurality of frames; and generating an instruction for a computer coupled to the touch sensitive input device to perform a function based on the correlated touch points.

2. The method of claim 1 wherein the search distance surrounding each touch point on the first frame for capturing the distinct touch point on the subsequent frame is independently determined.

3. The method of claim 1 wherein touch points identified on the subsequent frame outside of the search distance of any touch point on the first frame are designated as new touch points.

4. The method of claim 1 wherein the trajectory for each touch point on the first frame is based on projecting an association between the touch point on the first frame and a touch point on a prior frame.

5. The method of claim 1 wherein responsive to more than one touch point on the subsequent frame being within the search distance associated with each touch point on the first frame, identifying which of the more than one touch point is more closely aligned with the trajectory associated with each touch point on the first frame.

6. The method of claim 5 further comprising selecting the identified more than one touch point as the distinct touch point on the subsequent frame.

7. The method of claim 1 wherein a historical record of each touch point for each frame is stored.

8. A non-transitory computer-readable storage medium tangibly embodying a program of instructions executable by a machine wherein said program of instructions comprises a plurality of program codes for tracking a plurality of touch points across frames of a touch sensitive input device, wherein the plurality of touch points are input values corresponding touch locations sensed at the touch sensitive input device and wherein the plurality of touch points are used to generate an instruction for a computer coupled to the touch sensitive input device to perform a function, said program of instructions comprising:

program code for correlating each touch point on a first frame of the plurality of frames with a distinct touch point on a subsequent frame of the plurality of frames, wherein correlating comprises isolating the at least one distinct touch point by a search distance associated with each touch point on the first frame and a trajectory associated with each touch point on the first frame, and performing a trajectory cost function for each of the distinct touch points in the subsequent frame and associating one of the distinct touch points in the subsequent frame having a minimal cost function with a first touch point in the first frame to extend the trajectory, wherein the search distance for the distinct touch points on the subsequent frame in the program code has a magnitude based on a differential positional change of each touch point between the first frame and a prior frame of the plurality of frames.

9. The computer-readable storage medium of claim 8 wherein the search distance surrounding each touch point on the first frame for capturing the distinct touch point on the subsequent frame in the program code for correlating is independently determined.

10. The computer-readable storage medium of claim 9 wherein touch points identified on the subsequent frame outside of the search distance of any touch point on the first frame in the program code for correlating are designated as new touch points.

11. The computer-readable storage medium of claim 8 wherein the trajectory for each touch point on the first frame in the program code for correlating is based on projecting an association between the touch point on the first frame and a touch point on a prior frame.

12. The computer-readable storage medium of claim 8 wherein responsive to more than one touch point on the subsequent frame being within the search distance associated with each touch point on the first frame, further comprising program code for identifying which of the more than one touch point is more closely aligned with the trajectory associated with each touch point on the first frame.

13. A computer system for tracking a plurality of touch points across frames of a touch sensitive input device, the computer system comprising:

the touch sensitive input device configured to receive input values that are registered by touch locations of the plurality of touch points;

a machine capable of executing instructions embodied as software; and a plurality of software portions, wherein one of said software portions is operable to correlate each touch point on a first frame of the plurality of frames with a distinct touch point on a subsequent frame of the plurality of frames, wherein correlating comprises isolating the at least one distinct touch point by a search distance associated with each touch point on the first frame and a trajectory associated with each touch point on the first frame, and wherein the search distance for the at least one distinct touch point on the subsequent frame in the program code has a magnitude based on a differential positional change of each touch point between the first frame and a prior frame.

14. The computer system of claim 13 wherein the search distance surrounding each touch point on the first frame for capturing the distinct touch point on the subsequent frame is independently determined.

15. The computer system of claim 14 wherein touch points identified on the subsequent frame outside of the search distance of any touch point on the first frame are designated as new touch points.

16. The computer system of claim 13 wherein the trajectory for each touch point on the first frame is based on projecting an association between the touch point on the first frame and a touch point on a prior frame.

17. The computer system of claim 13 wherein responsive to more than one touch point on the subsequent frame being within the search distance associated with each touch point on the first frame, identifying which of the more than one touch point is more closely aligned with the trajectory associated with each touch point on the first frame.

* * * * *